(12) United States Patent
Kaneko et al.

(10) Patent No.: US 10,708,500 B2
(45) Date of Patent: Jul. 7, 2020

(54) MULTI-CAMERA SYSTEM, CAMERA, PROCESSING METHOD OF CAMERA, CONFIRMATION APPARATUS, AND PROCESSING METHOD OF CONFIRMATION APPARATUS FOR CAPTURING MOVING IMAGES

(71) Applicant: SONY CORPORATION, Tokyo (JP)

(72) Inventors: Tetsuo Kaneko, Kanagawa (JP);
Yasuhiro Iizuka, Tokyo (JP);
Shinnosuke Usami, Kanagawa (JP);
Kazuhiro Uchida, Tokyo (JP); Shigeo Nakatsuka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/066,733

(22) PCT Filed: Aug. 2, 2017

(86) PCT No.: PCT/JP2017/028118
§ 371 (c)(1),
(2) Date: Jun. 28, 2018

(87) PCT Pub. No.: WO2018/030242
PCT Pub. Date: Feb. 15, 2018

(65) Prior Publication Data
US 2019/0020820 A1     Jan. 17, 2019

(30) Foreign Application Priority Data

Aug. 9, 2016 (JP) ................................ 2016-156866

(51) Int. Cl.
*H04N 5/77* (2006.01)
*H04N 5/232* (2006.01)
(Continued)

(52) U.S. Cl.
CPC ....... *H04N 5/23251* (2013.01); *H04N 5/2251* (2013.01); *H04N 5/232* (2013.01);
(Continued)

(58) Field of Classification Search
CPC ......... H04N 5/23251; H04N 5/232061; H04N 21/21805; H04N 5/2251; H04N 5/232;
(Continued)

(56) References Cited

U.S. PATENT DOCUMENTS

| | | |
|---|---|---|
| 2002/0047895 A1 | 4/2002 | Di Bernardo et al. |
| 2005/0207672 A1 | 9/2005 | Di Bernardo et al. |

(Continued)

FOREIGN PATENT DOCUMENTS

| | | | |
|---|---|---|---|
| WO | WO 02/087218 A2 | 10/2002 | |
| WO | WO-02087218 A2 * | 10/2002 | ........... H04N 5/2627 |

OTHER PUBLICATIONS

International Search Report dated Apr. 30, 2018 in PCT/JP2017/028118.

*Primary Examiner* — Shan E Elahi
(74) *Attorney, Agent, or Firm* — Oblon, McClelland, Maier & Neustadt, L.L.P.

(57) ABSTRACT

An information processing apparatus, including circuitry configured to transmit a start instruction to a first camera apparatus and a second camera apparatus. The start instruction causes the first camera apparatus to start incrementing a first counter and the second camera apparatus to start incrementing a second counter for a video recording time period. The circuitry receives, from the first camera apparatus, a first recording-start frame identifier that indicates a value of the first counter and a second recording-end frame identifier that indicates the value of the second counter. The circuitry receives, from the second camera apparatus, a first recording-start frame identifier that identifies a value of the (Continued)

second counter and a second recording-end frame identifier that identifies the value of the second counter.

17 Claims, 9 Drawing Sheets

(51) Int. Cl.
  *H04N 5/262* (2006.01)
  *H04N 9/82* (2006.01)
  *H04N 5/247* (2006.01)
  *H04N 5/225* (2006.01)
  *H04N 21/218* (2011.01)

(52) U.S. Cl.
  CPC ....... *H04N 5/232061* (2018.08); *H04N 5/247* (2013.01); *H04N 5/262* (2013.01); *H04N 5/77* (2013.01); *H04N 9/8205* (2013.01); *H04N 21/21805* (2013.01)

(58) Field of Classification Search
  CPC ........ H04N 9/8205; H04N 5/77; H04N 5/262; H04N 5/247
  USPC ....................................................... 348/157
  See application file for complete search history.

(56) References Cited

U.S. PATENT DOCUMENTS

| | | |
|---|---|---|
| 2007/0299604 A1 | 12/2007 | Dibernardo et al. |
| 2009/0041298 A1* | 2/2009 | Sandler ................ G11B 27/034 382/103 |
| 2009/0303312 A1 | 12/2009 | Di Bernardo et al. |
| 2009/0319169 A1 | 12/2009 | Di Bernardo et al. |
| 2010/0169410 A1* | 7/2010 | Lund ................ G08B 13/19656 709/203 |
| 2011/0063432 A1 | 3/2011 | Di Bernardo et al. |
| 2013/0107034 A1 | 5/2013 | Di Bernardo et al. |
| 2013/0222583 A1* | 8/2013 | Earnshaw ........ H04N 21/47202 348/143 |
| 2015/0002639 A1* | 1/2015 | Kwon .................. H04N 13/254 348/47 |
| 2015/0081215 A1 | 3/2015 | Di Bernardo et al. |
| 2017/0332051 A1* | 11/2017 | Stern ..................... H04N 7/181 |
| 2018/0087902 A1 | 3/2018 | Di Bernardo et al. |

* cited by examiner

Example of table for switching image taken by
one camera to image taken by the other camera

|  | Recording-start frame number | Recording-end frame number |
|---|---|---|
| Camera A | 1 | 497 |
| Camera B | 496 | 501 |
| Camera C | 499 | 600 |

FIG.9A

Example of table for switching image taken by one camera to image taken by the other camera

|  | GOP/frame# upon recording-start trigger | Object IN GOP/frame# | Object OUT GOP/frame# |
|---|---|---|---|
| Camera A | GOP#1/frame#1 | GOP#1/frame#1 | GOP#10/frame#12 |
| Camera B | GOP#1/frame#1 | GOP#9/frame#5 | GOP#30/frame#2 |
| Camera C | GOP#1/frame#1 | GOP#29/frame#7 | GOP#55/frame#1 |

FIG.9B

Example of table for switching image taken by one camera to image taken by the other camera

|  | Object IN Timecode | Object OUT Timecode |
|---|---|---|
| Camera A | 00:00:00:12 | 00:00:05:22 |
| Camera B | 00:00:04:10 | 00:00:11:01 |
| Camera C | 00:00:09:17 | 00:00:15:29 |

MULTI-CAMERA SYSTEM, CAMERA, PROCESSING METHOD OF CAMERA, CONFIRMATION APPARATUS, AND PROCESSING METHOD OF CONFIRMATION APPARATUS FOR CAPTURING MOVING IMAGES

CROSS REFERENCE TO RELATED APPLICATIONS

This application claims the benefit of Japanese Priority Patent Application JP 2016-156866 filed Aug. 9, 2016, the entire contents of which are incorporated herein by reference.

TECHNICAL FIELD

The present technology relates to a multi-camera system, a camera, a processing method of the camera, a confirmation apparatus, and a processing method of the confirmation apparatus.

BACKGROUND ART

In sprint training or the like, in a case where a user wants to capture a moving image from a start to a goal, a plurality of cameras are installed along a course and capture the close-up moving image, because it is expensive to provide a camera moving along a lane. The user wants to confirm the moving images immediately after that in order to confirm a form or the like. In the past, the captured moving images are reproduced by the cameras, respectively. Alternatively, the captured moving images are imported into a device such as a personal computer, and the respective files of the captured moving images are reproduced by the device. It takes time and effort to reproduce the moving images captured by the plurality of cameras. Further, when a sprinter passes by image capturing ranges of the respective cameras, the user wants to see automatically switched moving images. However, there is no measure to do so.

For example, PTL 1 discloses a technology in which a plurality of cameras are used to accurately judge an-order-of-arrival of a footrace. However, PTL 1 fails to disclose a technology of recording and immediately reproducing all moving images from a start to a goal.

CITATION LIST

Patent Literature

PTL 1: Japanese Patent Application Laid-open No. 2006-339703

SUMMARY OF INVENTION

Technical Problem

It is desirable to confirm well moving images of moving objects captured sequentially by a plurality of cameras.

Solution to Problem

An information processing apparatus that includes a communication interface and processing circuitry. The processing circuitry configured to transmit a start instruction to a first camera apparatus and a second camera apparatus. The start instruction causes the first camera apparatus to start incrementing a first counter and the second camera apparatus to start incrementing a second counter for a video recording time period. The processing circuitry configured to receive, from the first camera apparatus, a first recording-start frame identifier that indicates a value of the first counter when recording of a first video by the first camera apparatus starts within the video recording time period and receive, from the first camera apparatus, a second recording-end frame identifier that indicates the value of the second counter when recording of the first video by the first camera apparatus stops within the video recording time period. The processing circuitry configured to receive, from the second camera apparatus, a first recording-start frame identifier that identifies a value of the second counter when recording of a second video by the second camera apparatus starts within the video recording time period and receive, from the second camera apparatus, a second recording-end frame identifier that identifies the value of the second counter when recording of the second video by the second camera apparatus stops within the video recording time period. The first video is associated with frame identifiers that indicate the values of the first of the first camera apparatus during the recording of the first video. The second video is associated with frame identifiers that indicate the values of the second counter by the second camera apparatus during the recording to the second video.

A system, including a first camera apparatus, a second camera apparatus, and an information processing apparatus. The information processing apparatus includes a communication interface and processing circuitry configured to transmit a start instruction to the first camera apparatus and the second camera apparatus. The start instruction causing the first camera apparatus to start incrementing a first counter and the second camera apparatus to start incrementing a second counter for a video recording time period. The processing circuitry is configured to receive, from the first camera apparatus, a first recording-start frame identifier that indicates a value of the first counter when recording of a first video by the first camera apparatus starts within the video recording time period and receive, from the first camera apparatus, a second recording-end frame identifier that indicates the value of the second counter when recording of the first video by the first camera apparatus stops within the video recording time period. The processing circuitry configured to receive, from the second camera apparatus, a first recording-start frame identifier that identifies a value of the second counter when recording of a second video by the second camera apparatus starts within the video recording time period and receive, from the second camera apparatus, a second recording-end frame identifier that identifies the value of the second counter when recording of the second video by the second camera apparatus stops within the video recording time period. The first video is associated with frame identifiers that indicate the values of the first of the first camera apparatus during the recording of the first video. The second video is associated with frame identifiers that indicate the values of the second counter by the second camera apparatus during the recording to the second video.

A non-transitory computer-readable medium storing instructions which when executed by a computer cause the computer to perform a method for receiving recording-start frame and recording-end frame identifiers, the method including transmitting a start instruction to a first camera apparatus and a second camera apparatus. The start instruction causes the first camera apparatus to start incrementing a first counter and the second camera apparatus to start incrementing a second counter for a video recording time period. The method includes receiving, from the first camera apparatus, a first recording-start frame identifier that indicates a value of the first counter when recording of a first video by the first camera apparatus starts within the video recording time period. The method includes receiving, from the first camera apparatus, a second recording-end frame identifier that indicates the value of the second counter when recording of the first video by the first camera apparatus stops within the video recording time period. The method includes receiving, from the second camera apparatus, a first recording-start frame identifier that identifies a value of the second counter when recording of a second video by the second camera apparatus starts within the video recording time period. The method includes receiving, from the second camera apparatus, a second recording-end frame identifier that identifies the value of the second counter when recording of the second video by the second camera apparatus stops within the video recording time period. The first video is associated with frame identifiers that indicate the values of the first of the first camera apparatus during the recording of the first video. The second video is associated with frame identifiers that indicate the values of the second counter by the second camera apparatus during the recording to the second video.

Advantageous Effects of Invention

According to the present technology, the user can confirm well moving images of moving objects captured sequentially by a plurality of cameras. It should be noted that the effects described in the present specification are merely illustrative and are not limitative, and may have additive effects.

BRIEF DESCRIPTION OF DRAWINGS

FIG. 9A and FIG. 9B show another examples of the table for switching an image taken by one camera to an image taken by another camera.

DESCRIPTION OF EMBODIMENTS

Hereinafter, a mode (hereinafter referred to as embodiment) for carrying out the present technology will be described. The embodiment of the present technology will be described in the following order.
1. Embodiment
2. Modification Examples 1. Embodiment (Configuration Example of Multi-camera System)

Figure 1:
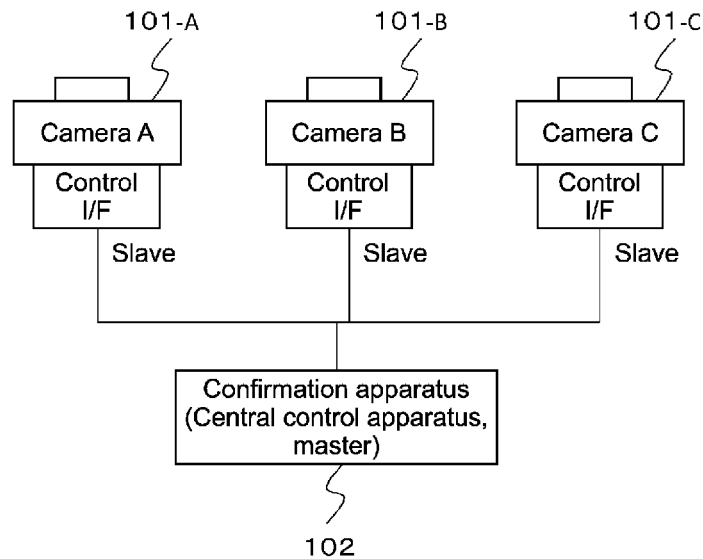
FIG. 1 is a block diagram showing a configuration example of a multi-camera system according to an embodiment of the present technology.

FIG. 1 shows a configuration example of a multi-camera system 10A according to an embodiment. The multi-camera system 10A includes a plurality of, here, three cameras (video cameras), i.e., a camera (camera A) 101-A, a camera (camera B) 101-B, and a camera (camera C) 101-C. In addition, the multi-camera system 10A includes a confirmation apparatus 102, which is a mobile terminal such as a smartphone and a tablet, a personal computer, or the like.

Figure 2:
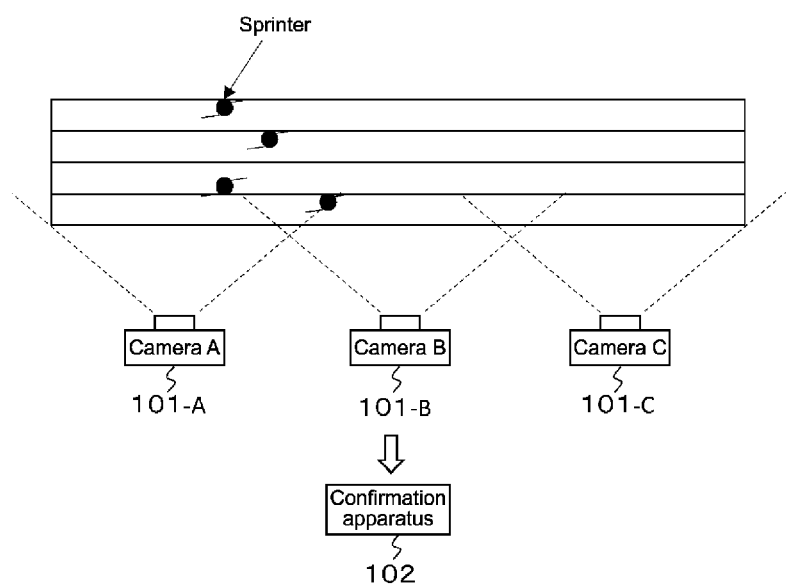
FIG. 2 is a diagram showing an installation status of a plurality of cameras.

The cameras 101-A, 101-B, and 101-C and the confirmation apparatus 102 are connected via a wired or wireless LAN. For example, the confirmation apparatus 102 functions as a master device, and the cameras 101-A, 101-B, and 101-C each functions as a slave device. FIG. 2 shows an installation status of the cameras 101-A, 101-B, and 101-C. The cameras 101-A, 101-B, and 101-C are arranged so as to capture images of ranges, respectively, the ranges being obtained by dividing a range in which the moving object moves linearly, for example, a 100 m sprinter runs a straight course. In this case, the respective cameras 101-A, 101-B, and 101-C are arranged side by side along the course at intervals. In this manner, the cameras 101-A, 101-B, and 101-C can capture all the images of the race from the beginning to the end. In this case, the image capturing ranges of one camera and the next camera are slightly overlapped.

The confirmation apparatus 102 causes (triggers) each camera to start and stop capturing an image in response to a user's operation. In this case, the confirmation apparatus 102, i.e., the master device, issues a trigger signal (command) to start or stop capturing an image to each camera. Each camera receives the trigger signal via a control interface (control I/F), which is configured to perform communication, and operates in response to the instruction. Note that the control interface of each camera is built in the camera. In addition, the confirmation apparatus 102 includes a panel (display). After capturing an image, a user can check the image captured by each camera on the panel.

The cameras 101-A, 101-B, and 101-C each includes an imager and a memory that writes image data obtained by capturing an image by the imager. In this case, the image data of each frame of a period, in which a moving object is present in the image data, out of image data captured by the imager (frame rate of 60 Hz, for example) is intraframe-compressed, i.e., compressed in JPEG format in this embodiment, and the compressed data is written into the memory.

When each of the cameras 101-A, 101-B, and 101-C receives a start trigger signal from the confirmation apparatus 102, each of the cameras 101-A, 101-B, and 101-C counts frame numbers from a frame corresponding to a timing of receiving the start trigger signal. For example, the frame number of the first frame is denoted as "1", and the frame numbers of the subsequent frames are successively incremented.

As described above, the image data written into the memory of each of the cameras 101-A, 101-B, and 101-C is in relation to the frame numbers. In addition, the image data of each frame is loop-recorded in the memory for at least a period, in which the moving object is present in the image capturing range of the imager, or longer. It should be noted that the image data of each frame may not necessarily be loop-recorded. Alternatively, the image data of each frame may be encoded, e.g., Advanced Video Coded (AVC), and the encoded data may be written into the memory. Each of the cameras 101-A, 101-B, and 101-C sends information on the frame numbers in relation to the image data of each frame written into the memory to the confirmation apparatus 102.

When each of the cameras 101-A, 101-B, and 101-C receives an end trigger signal from the confirmation apparatus 102, each of the cameras 101-A, 101-B, and 101-C stops a writing (recording) operation into the memory (an image-capturing operation is not necessarily stopped, but may be stopped). When each of the cameras 101-A, 101-B, and 101-C receives a transfer request including a frame number from the confirmation apparatus 102, each of the cameras 101-A, 101-B, and 101-C reads the image data of the frame specified by the frame number from the memory, and transfers the image data to the confirmation apparatus 102.

The confirmation apparatus 102 sends the start trigger signal to each camera in response to a user's operation to start capturing an image. In addition, the confirmation apparatus 102 sends the end trigger signal to each camera in response to a user's operation to stop capturing an image. The confirmation apparatus 102 includes an operation part configured to operate a position of a frame to be reproduced. The user operates the position of a frame to be reproduced by using the operation part.

When the confirmation apparatus 102 reproduces a frame image of a predetermined frame number, the confirmation apparatus 102 selectively sends a transfer request including the frame number to a camera that has the image data of the frame. In this case, the confirmation apparatus 102 selects the camera to send the transfer request on the basis of the information on the frame number in relation to the image data of the frame written into the memory sent from each of the plurality of cameras.

The confirmation apparatus 102 receives the image data of the frame having the specified frame number transferred from the camera, to which the confirmation apparatus 102 sends the transfer request as described above, and displays an image of the image data on the panel (display). In this case, the confirmation apparatus 102 sends successively the transfer requests including the successive frame numbers, and receives the image data of the respective successive frames to thereby reproduce the moving images.

(Configuration Example of Camera)

Figure 3:
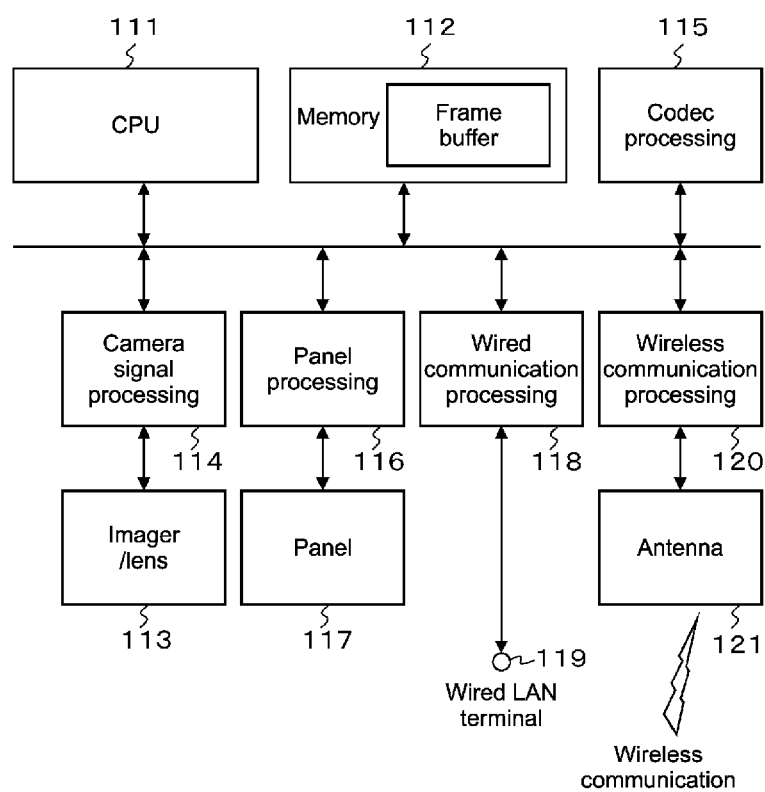
FIG. 3 is a block diagram showing a configuration example of the camera.

FIG. 3 shows a configuration example of the camera 101 (101-A, 101-B, and 101-C). The camera 101 includes a CPU 111, a memory 112, an imager/lens 113, a camera signal processing unit 114, and a codec processing unit 115. Further, the camera 101 includes a panel processing unit 116, a panel 117, a wired communication processing unit 118, a wired LAN terminal 119, a wireless communication processing unit 120, and an antenna 121.

The CPU 111 controls operation of components of the camera 101. The memory 112 stores control software and data, and constitutes a work area of the CPU 111 and the like. In addition, the memory 112 constitutes the frame buffer that loop-records the captured image data.

The imager/lens 113 includes an image capture lens and an imager, captures an image of an object, and obtains an image capture signal. The camera signal processing unit 114 processes the image capture signal obtained by the imager/lens 113, and generates image data (captured image data) corresponding to the object. The codec processing unit 115 JPEG-compresses the image data of each frame obtained by the camera signal processing unit 114. Thus, the image data of each frame is loop-recorded in the frame buffer of the memory 112 for a period, in which the moving object is present in the image data. For example, the CPU 111 performs a movement detection processing on the captured image data, and detects the presence of the moving object.

The panel processing unit 116 drives a panel 117 on the basis of the image data obtained by the camera signal processing unit 114, and displays a captured image on the panel 117. The panel 117 includes an LCD, an organic EL panel, or the like. The panel 117 has a touch panel function. As necessary, user interfaces (UIs) are also displayed on the panel 117 for user's operation.

The wired communication processing unit 118 communicates via wire with an external device, i.e., the confirmation apparatus 102 in this embodiment, via a wired LAN terminal 119. The wireless communication processing unit 120 communicates wirelessly with the external device, i.e., the confirmation apparatus 102 in this embodiment, via an antenna 121. Note that either the wireless communication or the wired communication is selected.

(Configuration Example of Confirmation Apparatus)

Figure 4:
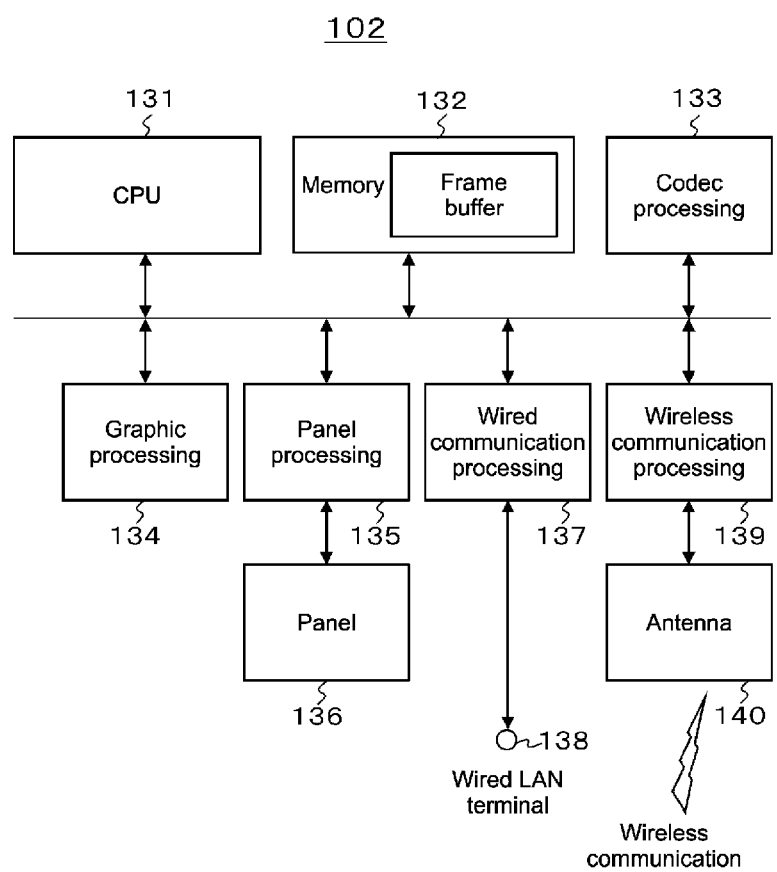
FIG. 4 is a block diagram showing a configuration example of a confirmation apparatus.

FIG. 4 shows a configuration example of the confirmation apparatus 102. The confirmation apparatus 102 includes a CPU 131, a memory 132, a codec processing unit 133, and a graphic processing unit 134. In addition, the confirmation apparatus 102 includes a panel processing unit 135, a panel 136, a wired communication processing unit 137, a wired LAN terminal 138, a wireless communication processing unit, and an antenna 140.

The CPU 131 controls operation of components of the confirmation apparatus 102. The memory 132 stores control software and data, and constitutes a work area of the CPU 131 and the like. In addition, the memory 132 temporarily records the image data of each frame transferred from the camera 101 (see FIG. 3).

Also, the memory 132 stores information on the frame numbers in relation to the image data of the frames written into the memory of each camera and sent from each camera. As described above, when the confirmation apparatus 102 reproduces the frame image of the predetermined frame number, the information is used to specify the camera that has the image data of the frame.

The codec processing unit 133 reads the image data of each frame temporarily recorded in the frame buffer of the memory 132, and decompresses the image data for displaying the image. The panel processing unit 135 drives the panel 136 on the basis of the image data decompressed by the codec processing unit 133, and displays the image on the panel 136. The panel 136 includes an LCD, an organic EL panel, or the like. The panel 136 has a touch panel function. As necessary, UIs are also displayed on the panel 136 for user's operation.

The wired communication processing unit 137 communicates via wire with an external device, i.e., the camera 101 in this embodiment, via a wired LAN terminal 138. The wireless communication processing unit 139 communicates wirelessly with the external device, i.e., the camera 101 in this embodiment, via an antenna 140. Note that either the wireless communication or the wired communication is selected.

(Example of Counting Frame Numbers in Response to Start Trigger and Recording Frames)

Figure 5:
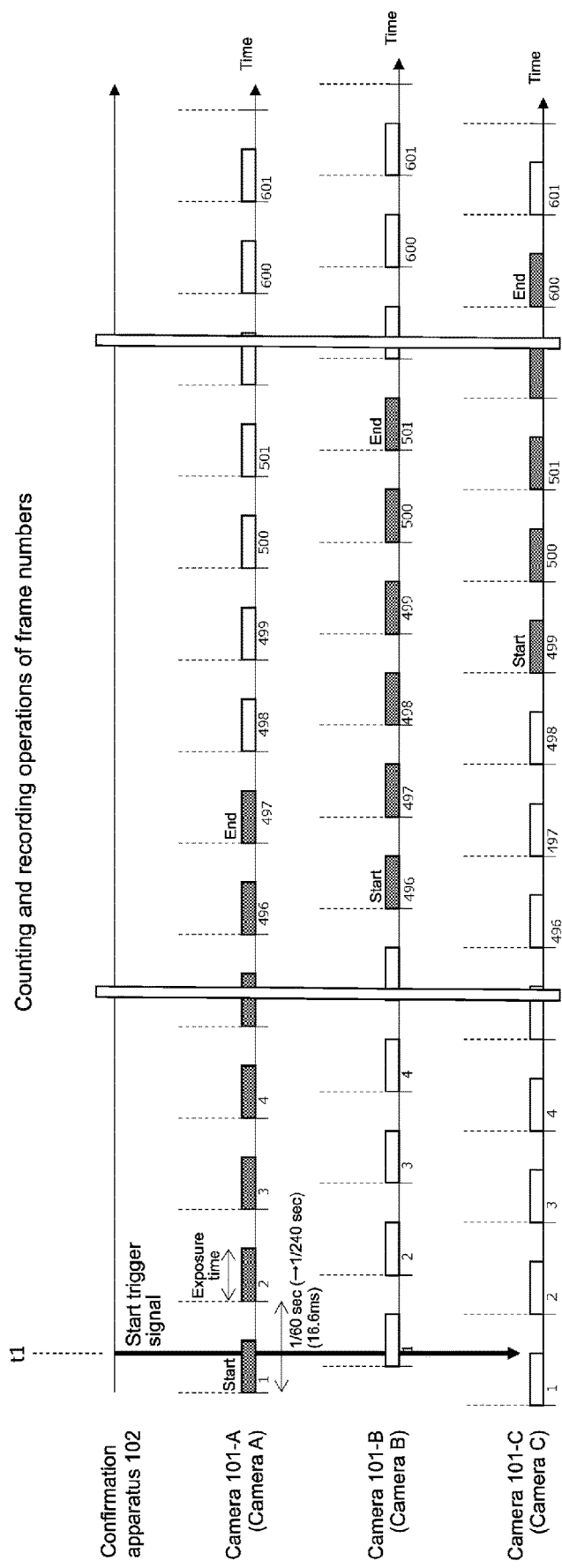
FIG. 5 is a diagram showing an example that each camera counts frame numbers and records frames.

FIG. 5 shows an example that each camera counts the frame numbers when the confirmation apparatus 102 sends the start trigger signal to each camera, and records the frames. The recorded frames of each camera correspond to the frames of the period, in which the moving object is present in the image capturing range of each camera.

At the time t1, the confirmation apparatus 102 sends the start trigger signal (record instruction signal) to each camera, for example, on the basis of the user's operation. When each camera receives the start trigger signal, each camera is in a standby state for recording, and counts the frame numbers starting from the frame at the time t1. In this case, the frame number of the first frame is denoted as "1", and the frame numbers of the subsequent frames are successively incremented. In this manner, the same frame number is assigned to the frames at the same time point taken by the respective cameras.

Each camera does not record (write) the image data of all the frames in the frame buffer of the memory 112, but records only the image data of the frames of a period, in which a moving object is present in the image data. Thus, it is possible to reduce electric power consumption and to save the frame buffer of the memory 112.

In the example shown in FIG. 5, the camera (camera A) 101-A treats the frames having the frame numbers of "1" to "497" as recorded frames, records the image data of the respective frames in the frame buffer of the memory 112 in relation to the frame numbers, and sends information on the recorded-frame numbers including the recording-start frame number "1" and the recording-end frame number "497" to the confirmation apparatus 102.

In the example shown in FIG. 5, the camera (camera B) 101-B treats the frames having the frame numbers of "496" to "501" as recorded frames, records the image data of the respective frames in the frame buffer of the memory 112 in relation to the frame numbers, and sends information on the recorded-frame numbers including the recording-start frame number "1" and the recording-end frame number "501" to the confirmation apparatus 102.

In the example shown in FIG. 5, the camera (camera C) 101-C treats the frames having the frame numbers of "499" to "600" as recorded frames, records the image data of the respective frames in the frame buffer of the memory 112 in relation to the frame numbers, and sends information on the recorded-frame numbers including the recording-start frame number "499" and the recording-end frame number "600" to the confirmation apparatus 102.

Figures 6, 7:
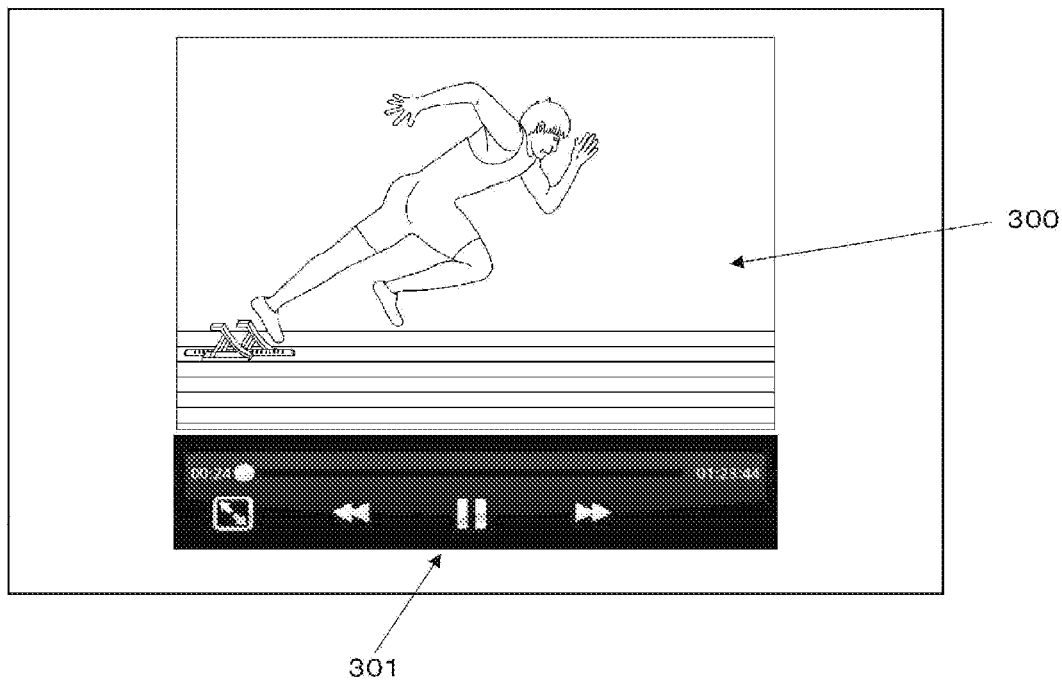
FIG. 6 is a diagram showing an example that a table for switching an image taken by one camera to an image taken by another camera.
FIG. 7 is a diagram showing an example of a screen for reproducing images (moving image content) captured by multiple cameras and displayed on a panel of the confirmation apparatus.

As shown in FIG. 6, the confirmation apparatus 102 generates a table for switching an image taken by one camera to an image taken by another camera on the basis of the information on the recorded-frame numbers, and holds the table.

Note that, not shown in the drawings, after a predetermined time passes after sending the start trigger signal (record instruction signal) to each camera, for example, after several tens of seconds in a case of 100 m sprint, the confirmation apparatus 102 sends the end trigger signal (record stop signal) to each camera, for example, on the basis of the user's operation. When each camera receives the end trigger signal, each camera is in a state unable to record.

The standby state for recording of each camera may be preset after a predetermined time passes after sending the start trigger signal (record instruction signal). In this case, the confirmation apparatus 102 does not have to send the end trigger signal (record stop signal) to each camera. The respective cameras may not necessarily have the same exposure phase, for example, using a generator lock (Genlock). In addition, timing differences are permissible when the start trigger signal (record instruction signal) reaches the respective cameras from the confirmation apparatus 102.

However, if the respective cameras have the same exposure phase and the same trigger timing, an image taken by one camera can be smoothly switched to an image taken by another camera when reproducing the image.

(Example of User Interfaces on Confirmation Apparatus)

FIG. 7 shows an example of a screen for reproducing images (moving image content) captured by the multiple cameras and displayed on the panel 136 of the confirmation apparatus 102. In this example, the position of a frame to be reproduced corresponds to a recording period of the camera (camera A) 101-A, and an image 300 captured by the camera (camera A) 101-A is displayed. An UI screen is superimposed on the captured image of the screen for the user's operation.

A user operates a play operation part 301, in which play icons are displayed. As a result, the image captured by the selected camera on the screen can be operated normally including reproduction, pause, fast forward, rewind, frame-by-frame advance, and the like. Here, a scroll bar is provided next to the play icons, which is scrolled with a finger to perform frame-by-frame advance forward and backward, fast forward, and rewind.

The user can perform a reproduction operation on a series of images from start to goal without regard to the plurality of cameras. The confirmation apparatus 102 automatically switches an image taken by one camera to an image taken by another other camera in response to the position of a frame to be reproduced (position of frame numbers to be reproduced). At this time, the confirmation apparatus 102 refers the above-described table for switching (see FIG. 6). The image taken by one camera is switched to the image taken by another camera in a period including overlapped positions of the frames of the two cameras, for example, near the middle of the overlapped positions of the frames. Note that information on timing of switching may be saved as a file, and may be used to automatically edit moving images of a main course.

For example, an image taken by one camera may be switched to an image taken by another camera at a predetermined timing when the two camera arranged side by side at intervals capture an image of the first sprinter at the same time. Alternatively, an image taken by one camera may be switched to an image taken by another camera after two frames after that timing, i.e., an offset may be preset. Alternatively, information on a radio frequency identification (RFID) tag may be used. Alternatively, an ID on a clothing may be detected by a camera and used. Alternatively, an image taken by one camera may be switched to an image taken by another camera at the moment of capturing an image of a predetermined person by using facial recognition, or the like. It should be appreciated that the present technology is applicable not only to a person's race but also to a car race, or the like.

(Communication Sequence between Confirmation Apparatus and Each Camera)

Figure 8:
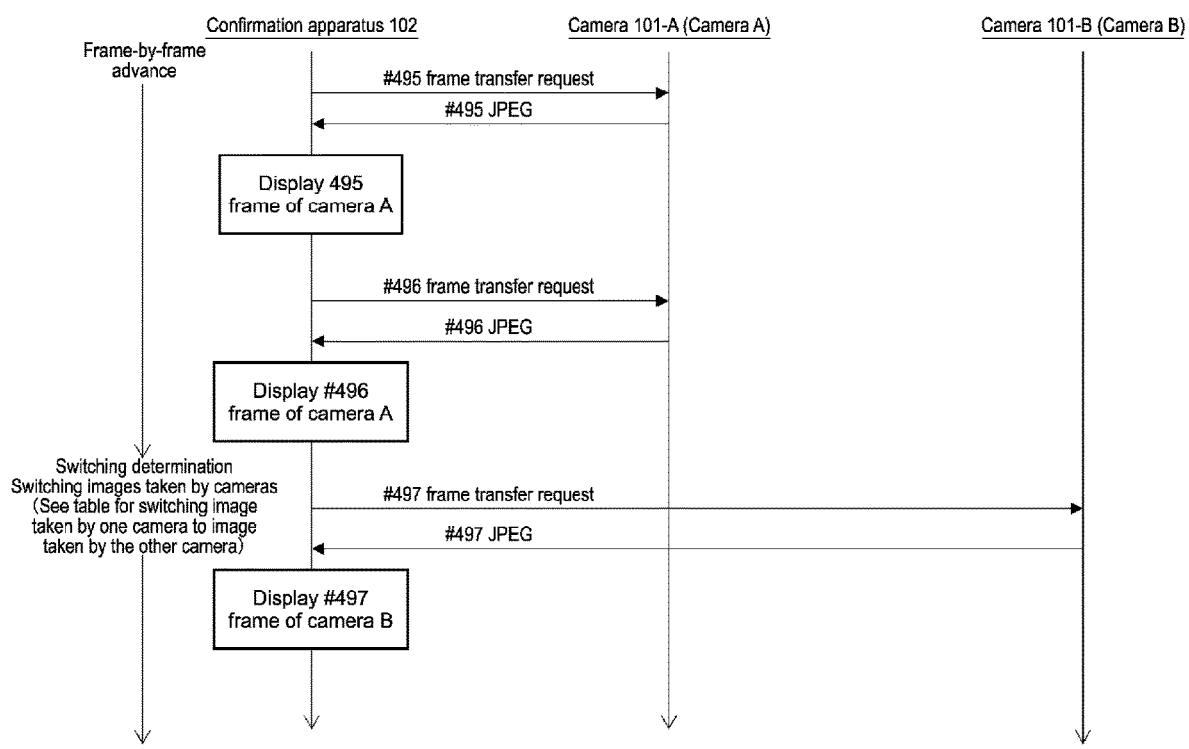
FIG. 8 is a diagram showing a communication sequence example between the confirmation apparatus and each camera at the time of the reproduction.

FIG. 8 is a diagram showing a communication sequence example between the confirmation apparatus 102 and each camera at the time of the reproduction. Here, FIG. 8 shows a communication example that the images are displayed by frame-by-frame advance.

The confirmation apparatus 102 requests the camera (camera A) 101-A to transfer the image data of the #495 frame (in this case, compressed and coded in JPEG format). In response, the camera (camera A) 101-A reads the image data of the #495 frame in the frame buffer of the camera (camera A) 101-A, and transfers the image data to the confirmation apparatus 102. As a result, the image of the image data of the #495 frame is displayed on the panel 136 of the confirmation apparatus 102.

Next, the confirmation apparatus 102 similarly requests the camera (camera A) 101-A to transfer the image data of the #496 frame. In response, the camera (camera A) 101-A reads the image data of the #496 frame in the frame buffer of the camera (camera A) 101-A, and transfers the image data to the confirmation apparatus 102. As a result, the image of the image data of the #496 frame is displayed on the panel 136 of the confirmation apparatus 102.

Next, the confirmation apparatus 102 switches the camera (camera A) 101-A to the (camera B) 101-B on the basis of the table for switching. The confirmation apparatus 102 requests the camera (camera B) 101-B to transfer the image data of the #497 frame. In response, the camera (camera B) 101-B reads the image data of the #497 frame in the frame buffer of the camera (camera B) 101-B, and transfers the image data to the confirmation apparatus 102. As a result, the image of the image data of the #497 frame is displayed on the panel 136 of the confirmation apparatus 102. The similar operation will be repeated thereafter.

(Example of Improvement in Display Latency)

In the above-described example, the confirmation apparatus 102 acquires image data of a predetermined frame from a predetermined camera that took the image every time the confirmation apparatus 102 displays the image of the predetermined frame taken by the predetermined camera. In this case, it is undesirably expected to prolong display latency depending on the status of a communication path, in particular where the confirmation apparatus 102 is connected to each camera via the wireless LAN.

In order to improve the display latency, it is conceivable that the memory 132 of the confirmation apparatus 102 (see FIG. 4) includes the frame buffer, and a content-to-be-reproduced of each camera is downloaded to the frame buffer in advance. After the buffering, the confirmation apparatus 102 reproduces the images without communication, i.e., closed, and unaffected by the status of a communication path. As a result, the display latency is improved.

As described above, in the multi-camera system 10A shown in FIG. 1, each camera counts the frame numbers from the frame corresponding to the timing of receiving the start trigger signal from the confirmation apparatus 102, and writes, into the memory 112, the image data of the frames of the period, in which the moving object is present, in relation to the counted frame numbers. When the confirmation apparatus 102 reproduces the frame image of the predetermined frame number, the confirmation apparatus 102 selectively sends the transfer request including the frame number to the camera that has the image data of the frame, and the confirmation apparatus 102 displays the image of the image data sent from the predetermined camera. Thus, the user can confirm well the moving images of the moving objects captured sequentially by the respective cameras on the confirmation apparatus 102.

In this case, the confirmation apparatus 102 records the frame numbers in relation to the moving images of all the cameras, the frame numbers being on the basis of the trigger signal. In addition, each camera intraframe-compresses the image data of the frames having the frame numbers. Therefore, the confirmation apparatus 102 communicates only with the camera having the image data of desired frames, and thus acquires the image data of the desired frames with low latency and a low transmission bandwidth. In addition, since the intraframe-compressed image data is reproduced, the confirmation apparatus 102 needs less process steps, and the image data can be reproduced with low (stress-free) display latency/frame rate.

2. Modification Examples

In the example of the above-described embodiment, each camera sends information on the recorded-frame numbers including the recording-start frame number and the recording-end frame number to the confirmation apparatus 102. The confirmation apparatus 102 holds the table, the table being generated on the basis of the information on the recorded-frame numbers from the cameras (see FIG. 6). The confirmation apparatus 102 switches an image taken by one camera to an image taken by another camera with reference to the table.

However, the table for switching is not limited to the one generated on the basis of the information on the recorded-frame numbers. For example, FIG. 9A shows an example of the table for switching in which each camera does not intraframe-compress i.e., compress in the JPEG format as described in the above-described embodiment, moving image files, but encodes moving image files with a group of pictures (GOP) configuration such as the AVC, for example. In this case, the confirmation apparatus 102 uses GOP numbers and the frame numbers included in the GOP to specify the frames to be displayed.

In this case, when the confirmation apparatus 102 sends the start trigger signal (record instruction signal) to each camera, each camera encodes the frame, for example, having the GOP number of #1 and the frame number of #1 corresponding to the timing. Each camera records the image data of the GOPs including the image data of each frame for at least a period, in which a moving object is present in the frame buffer of the memory 112. Then, each camera sends to the confirmation apparatus 102 the information on the GOP number and the frame number of the recording-start frame "object IN GOP/frame#" and the GOP number and the frame number of the recording-end frame "object OUT GOP/frame#" for at least a period, in which a moving object is present in the image capturing range of the imager.

Further, for example, FIG. 9B shows another example of the table for switching in which the respective cameras are time-code synchronized. In this case, the confirmation apparatus 102 uses a time code to specify the frame to be displayed.

In this case, each camera records the image data of each frame for at least a period, in which a moving object is present in the frame buffer of the memory 112 with the time code. Then, each camera sends to the confirmation apparatus 102 the time code "object IN Timecode" of the frame number of the recording-start frame and the time code "object OUT time code" of the frame number of the recording-end frame for at least a period, in which a moving object is present in the image capturing range of the imager.

In the above-described embodiment, the image data of the images captured by the cameras 101-A, 101-B, and 101-C has a frame rate of 60 Hz. The present technology is also applicable to the case that the image data of the images captured by the cameras 101-A, 101-B, and 101-C has another frame rate, e.g., a high frame rate of 240 Hz as shown in FIG. 5.

In the above-described embodiment, the numbers of the cameras are three. The present technology is also applicable to the case that the number of the cameras is two, four, or more than four.

In the above-described embodiment, each camera includes the control interface. Alternatively, it is conceivable that the camera may not include the control interface, and an external control device may be provided for each camera.

Figure 10:
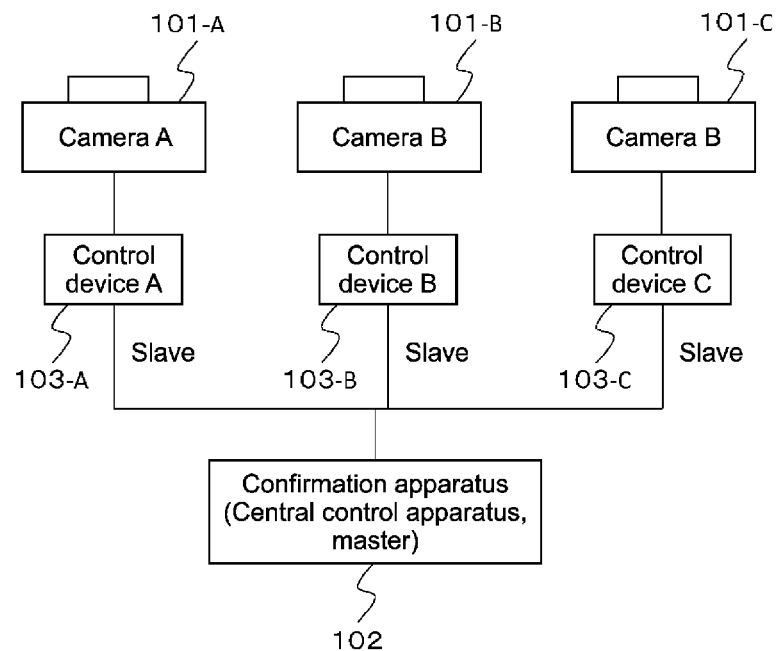
FIG. 10 is a block diagram showing another configuration example of the multi-camera system.

FIG. 10 shows a configuration example of the multi-camera system 10B of that case. The components of FIG. 10 corresponding to those of FIG. 1 are denoted by the same reference signs. Each of the cameras 101-A, 101-B, and 101-C includes no control interface (control I/F) unlike those of the multi-camera system 10A shown in FIG. 1. The cameras 101-A, 101-B, and 101-C include an external control device (control device A) 101-A, an external control device (control device B) 101-B, an external control device (control device C) 101-C having the similar functions as the control interface (control I/F), respectively.

Figure 11:
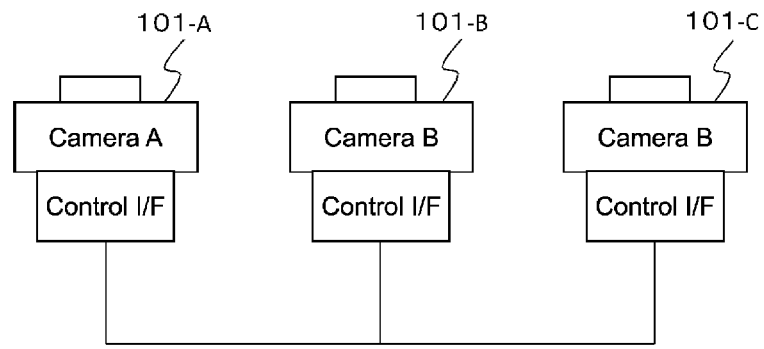
FIG. 11 is a block diagram showing another configuration example of the multi-camera system.

In the above-described embodiment, the confirmation apparatus 102 independent of the cameras 101-A, 101-B, and 101-C is provided. Alternatively, it is conceivable that no confirmation apparatus 102 may be provided, and any of the cameras 101-A, 101-B, and 101-C may also function as the confirmation apparatus. FIG. 11 shows a configuration example of a multi-camera system 10C of that case. The components of FIG. 11 corresponding to those of FIG. 1 are denoted by the same reference signs.

Figure 12:
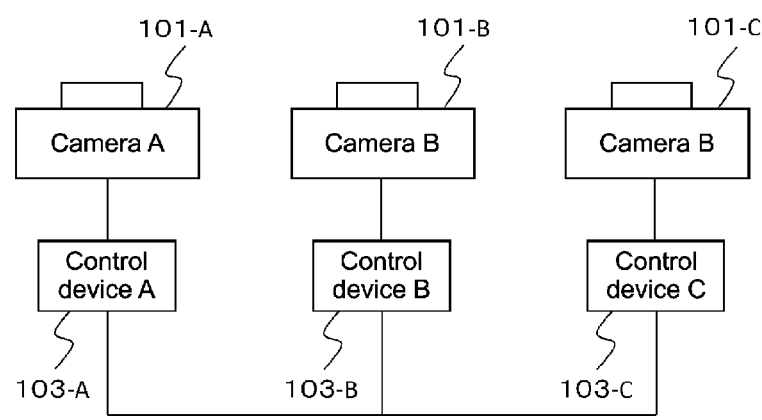
FIG. 12 is a block diagram showing another configuration example of the multi-camera system.

Note that the multi-camera system 10C shown in FIG. 11 corresponds to the multi-camera system 10A shown in FIG. 1. The same applies to the multi-camera system 10B shown in FIG. 10. FIG. 12 shows a configuration example of the multi-camera system 10D corresponding to the multi-camera system 10B shown in FIG. 10, detailed description of which is omitted.

It should be understood by those skilled in the art that various modifications, combinations, sub-combinations and alterations may occur depending on design requirements and other factors insofar as they are within the scope of the appended claims or the equivalents thereof.

The technology according to an embodiment of the present disclosure can be applied to various products. For example, the technology according to an embodiment of the present disclosure may be applied to the medical environment, such as in a surgery room system.

The present technology may also have the following configurations.

(1) An information processing apparatus, including a communication interface, and processing circuitry configured to transmit a start instruction to a first camera apparatus and a second camera apparatus, the start instruction causing the first camera apparatus to start incrementing a first counter and the second camera apparatus to start incrementing a second counter for a video recording time period; receive, from the first camera apparatus, a first recording-start frame identifier that indicates a value of the first counter when recording of a first video by the first camera apparatus starts within the video recording time period; receive, from the first camera apparatus, a second recording-end frame identifier that indicates the value of the second counter when recording of the first video by the first camera apparatus stops within the video recording time period; receive, from the second camera apparatus, a first recording-start frame identifier that identifies a value of the second counter when recording of a second video by the second camera apparatus starts within the video recording time period; and receive, from the second camera apparatus, a second recording-end frame identifier that identifies the value of the second counter when recording of the second video by the second camera apparatus stops within the video recording time period, in which the first video is associated with frame identifiers that indicate the values of the first of the first camera apparatus during the recording of the first video, and the second video is associated with frame identifiers that indicate the values of the second counter by the second camera apparatus during the recording to the second video.

(2) The information processing apparatus according to feature (1), in which the first video corresponds to a first field of view; and the second video corresponds to a second field of view that is different from the first field of view.

(3) The information processing apparatus according to feature (1) or (2), in which the first video is recorded during a first sub-period of the video recording time period, and the second video is recorded during a second sub-period of the recording time period that starts after a start time of the first sub-period.

(4) The information processing apparatus according to any one of features (1)-(3), in which the processing circuitry is configured to transmit an end instruction to the first camera apparatus and the second camera apparatus, the end instruction indicating an end of the video recording time period.

(5) The information processing apparatus according to any one of features (1)-(4), in which the start instruction causes the first camera apparatus to start incrementing the first counter and the second camera apparatus to start incrementing the second counter for the entire video recording time period.

(6) The information processing apparatus according to feature (5), in which the start instruction causes the first camera apparatus to start incrementing the first counter irrespective of whether the first video is being recorded, and the start instruction causes the second camera apparatus to start incrementing the second counter irrespective of whether the second video is being recorded.

(7) The information processing apparatus according to any one of features (1)-(6), in which the processing circuitry is configured to request frames of the first video from the first camera apparatus based on the first recording-start frame identifier and the first recording-end frame identifier; receive the frames of the first video from the first camera apparatus; playback the frames of the first video received from the first camera apparatus; request frames of the second video from the second camera apparatus based on the second recording-start frame identifier and the second recording-end frame identifier; receive the frames of the first video from the first camera apparatus; and playback the frames of the second video received from the second camera apparatus.

(8) The information processing apparatus according to any one of features (1)-(7), in which the first and second counters are frame counters.

(9) A system, including a first camera apparatus; a second camera apparatus; and an information processing apparatus, including a communication interface, and processing circuitry configured to transmit a start instruction to the first camera apparatus and the second camera apparatus, the start instruction causing the first camera apparatus to start incrementing a first counter and the second camera apparatus to start incrementing a second counter for a video recording time period; receive, from the first camera apparatus, a first recording-start frame identifier that indicates a value of the first counter when recording of a first video by the first camera apparatus starts within the video recording time period; receive, from the first camera apparatus, a second recording-end frame identifier that indicates the value of the second counter when recording of the first video by the first camera apparatus stops within the video recording time period; receive, from the second camera apparatus, a first recording-start frame identifier that identifies a value of the second counter when recording of a second video by the second camera apparatus starts within the video recording time period; and receive, from the second camera apparatus, a second recording-end frame identifier that identifies the value of the second counter when recording of the second video by the second camera apparatus stops within the video recording time period, in which the first video is associated with frame identifiers that indicate the values of the first of the first camera apparatus during the recording of the first video, and the second video is associated with frame identifiers that indicate the values of the second counter by the second camera apparatus during the recording to the second video.

(10) A non-transitory computer-readable medium storing instructions which when executed by a computer cause the computer to perform a method for receiving recording-start frame and recording-end frame identifiers, the method including transmitting a start instruction to a first camera apparatus and a second camera apparatus, the start instruction causing the first camera apparatus to start incrementing a first counter and the second camera apparatus to start incrementing a second counter for a video recording time period; receiving, from the first camera apparatus, a first recording-start frame identifier that indicates a value of the first counter when recording of a first video by the first camera apparatus starts within the video recording time period; receiving, from the first camera apparatus, a second recording-end frame identifier that indicates the value of the second counter when recording of the first video by the first camera apparatus stops within the video recording time period; receiving, from the second camera apparatus, a first recording-start frame identifier that identifies a value of the second counter when recording of a second video by the second camera apparatus starts within the video recording time period; and receiving, from the second camera apparatus, a second recording-end frame identifier that identifies the value of the second counter when recording of the second video by the second camera apparatus stops within the video recording time period, in which the first video is associated with frame identifiers that indicate the values of the first of the first camera apparatus during the recording of the first video, and the second video is associated with frame identifiers that indicate the values of the second counter by the second camera apparatus during the recording to the second video.

(11) The non-transitory computer-readable medium according to feature (10), in which the first video corresponds to a first field of view; and the second video corresponds to a second field of view that is different from the first field of view.

(12) The non-transitory computer-readable medium according to feature (10) or (11), in which the first video is recorded during a first sub-period of the video recording time period, and the second video is recorded during a second sub-period of the recording time period that starts after a start time of the first sub-period.

(13) The non-transitory computer-readable medium according to any one of features (10)-(12), further including transmitting an end instruction to the first camera apparatus and the second camera apparatus, the end instruction indicating an end of the video recording time period.

(14) The non-transitory computer-readable medium according to any one of features (10)-(13), in which the start instruction causes the first camera apparatus to start incrementing the first counter and the second camera apparatus to start incrementing the second counter for the entire video recording time period.

(15) The non-transitory computer-readable medium according to feature (14), in which the start instruction causes the first camera apparatus to start incrementing the first counter irrespective of whether the first video is being recorded, and the start instruction causes the second camera apparatus to start incrementing the second counter irrespective of whether the second video is being recorded.

(16) The non-transitory computer-readable medium according to any one features (10)-(15), further including requesting frames of the first video from the first camera apparatus based on the first recording-start frame identifier and the first recording-end frame identifier; receiving the frames of the first video from the first camera apparatus; playing back the frames of the first video received from the first camera apparatus; requesting frames of the second video from the second camera apparatus based on the second recording-start frame identifier and the second recording-end frame identifier; receiving the frames of the first video from the first camera apparatus; and playing back the frames of the second video received from the second camera apparatus.

(17) The non-transitory computer-readable medium according to any one of features (10)-(17), in which the first and second counters are frame counters.

(18) The method for receiving recording-start frame and recording-end frame identifiers according to any one of features (10)-(17).

The present technology may further have the following configurations.

(1) A multi-camera system, including:
a plurality of cameras; and
a confirmation apparatus connected via wire or wirelessly to the plurality of cameras,
each of the cameras including
an imager,
a memory, and
a control unit that controls processing of, when receiving a start trigger signal from the confirmation apparatus, counting frame numbers from a frame corresponding to a timing of receiving the start trigger signal, processing of writing, into the memory, image data of frames of a period, in which a moving object is present in the image data, out of image data captured by the imager, in relation to the counted frame numbers, processing of sending information on the frame numbers in relation to the image data of the frames written into the memory, and processing of, when receiving a transfer request including a frame number from the confirmation apparatus, reading the image data of the frame specified by the frame number from the memory, and transferring the image data to the confirmation apparatus,
the confirmation apparatus including
a display, and
a control unit that controls processing of sending the start trigger signal to each of the plurality of cameras, processing of sending the transfer request including the frame number to a predetermined camera selected from the plurality of cameras on the basis of the information on the frame numbers in relation to the image data of the frames written into the memory sent from each of the plurality of cameras, and processing of receiving the image data of the frame specified by the frame number transferred from the predetermined camera, and displaying an image of the image data on the display.

(2) The multi-camera system according to (1), in which the plurality of cameras capture images of ranges, respectively, the ranges being obtained by dividing a range in which the moving object moves linearly.

(3) A camera, including:
an imager,
a memory, and
a control unit that controls processing of, when receiving a start trigger signal from the confirmation apparatus, counting frame numbers from a frame corresponding to a timing of receiving the start trigger signal, processing of writing, into the memory, image data of frames of a period, in which a moving object is present in the image data, out of image data captured by the imager, in relation to the counted frame numbers, processing of sending information on the frame numbers in relation to the image data of the frames written into the memory, and processing of, when receiving a transfer request including a frame number from the confirmation apparatus, reading the image data of the frame specified by the frame number from the memory, and transferring the image data to the confirmation apparatus,
the confirmation apparatus including
a display, and
a control unit that controls processing of sending the start trigger signal to each of the plurality of cameras, processing of sending the transfer request including the frame number to a predetermined camera selected from the plurality of cameras on the basis of the information on the frame numbers in relation to the image data of the frames written into the memory sent from each of the plurality of cameras, and processing of receiving the image data of the frame specified by the frame number transferred from the predetermined camera, and displaying an image of the image data on the display.

(4) The camera according to (3), in which
the image data of the frames is intraframe-compressed, and is written into the memory, and
the intraframe-compressed image data of the frame specified by the frame number is transferred to the confirmation apparatus.

(5) The camera according to (3) or (4), in which
the image data of each frame is loop-recorded in the memory for at least a period, in which the moving object is present in the image capturing range of the imager, or longer.

(6) A processing method of a camera, the camera including an imager and a memory, the method including the steps of:
when receiving a start trigger signal from the confirmation apparatus, counting frame numbers from a frame corresponding to a timing of receiving the start trigger signal;
writing, into the memory, image data of frames of a period, in which a moving object is present in the image data, out of image data captured by the imager, in relation to the counted frame numbers;
sending information on the frame numbers in relation to the image data of the frames written into the memory; and
when receiving a transfer request including the frame number from the confirmation apparatus, reading the image data of the frame specified by the frame number from the memory and transferring to the confirmation apparatus.

(7) A confirmation apparatus, including:
a display, and
a control unit that controls processing of sending the start trigger signal to each of the plurality of cameras, processing of sending the transfer request including the frame number to a predetermined camera selected from the plurality of cameras on the basis of the information on the frame numbers in relation to the image data of the frames written into the memory sent from each of the plurality of cameras, and processing of receiving the image data of the frame specified by the frame number transferred from the predetermined camera, and displaying an image of the image data on the display.

(8) The confirmation apparatus according to (7), further including: an operation part configured to operate a position of a frame to be reproduced.

(9) The confirmation apparatus according to (8), in which the operation part is a touch panel arranged on a screen of the display.

(10) The confirmation apparatus according to (9), in which a scroll bar configured to operate the position of a frame to be reproduced is displayed on the display.

(11) A processing method of a confirmation apparatus, the confirmation apparatus including a display, the method including the steps of:
sending the start trigger signal to each of the plurality of cameras;
sending the transfer request including the frame number to a predetermined camera selected from the plurality of cameras on the basis of the information on the frame numbers in relation to the image data of the frames written into the memory sent from each of the plurality of cameras; and
receiving the image data of the frame specified by the frame number transferred from the predetermined camera, and displaying an image of the image data on the display.

(12) A multi-camera system, including:
a plurality of cameras; and
a confirmation apparatus connected via wire or wirelessly to the plurality of cameras, each of the cameras including
an imager,
a memory, and
a control unit that controls
processing of writing, into the memory, image data of frames of a period, in which a moving object is present in the image data, out of image data captured by the imager,
processing of sending information on a frame period of the image data written into the memory, and
processing of, when receiving a transfer request including information on a frame to be reproduced from the confirmation apparatus, reading the image data of the frame to be reproduced from the memory, and transferring the image data to the confirmation apparatus,
the confirmation apparatus including
a display, and
a control unit that controls processing of sending the transfer request including the information on a frame to be reproduced to a predetermined camera selected from the plurality of cameras on the basis of the information on a frame period sent from each of the plurality of cameras, and processing of receiving the image data of the frame to be reproduced transferred from the predetermined camera, and displaying an image of the image data on the display.

(13) The confirmation apparatus according to (12), in which
the information on a frame period is information indicated by a frame number, a group of pictures (GOP) number and the frame number, or a time code.

(14) A camera, including:
an imager,
a memory, and
a control unit that controls
processing of writing, into the memory, image data of frames of a period, in which a moving object is present in the image data, out of image data captured by the imager,
processing of sending information on a frame period of the image data written into the memory, and
processing of, when receiving a transfer request including information on a frame to be reproduced from the confirmation apparatus, reading the image data of the frame to be reproduced from the memory, and transferring the image data to the confirmation apparatus.

(15) A confirmation apparatus, including:
a display, and
a control unit that controls processing of sending the transfer request including the information on a frame to be reproduced to a predetermined camera selected from the plurality of cameras on the basis of the information on a frame period sent from each of the plurality of cameras, and processing of receiving the image data of the frame to be reproduced transferred from the predetermined camera, and displaying an image of the image data on the display.

REFERENCE SIGNS LIST 10A, 10B, 10C, 10D multi-camera system
101, 101-A, 101-B, and 101-C camera
102 confirmation apparatus
103-A, 103-B, 103-C control device
111 CPU
112 memory
113 imager/lens
114 camera signal processing unit
115 codec processing unit
116 panel processing unit
117 panel
118 wired communication processing unit
119 wired LAN terminal
120 wireless communication processing unit
121 antenna
131 CPU
132 memory
133 codec processing unit
134 graphic processing unit
135 panel processing unit
136 panel
137 wired communication processing unit
138 wired LAN terminal
139 wireless communication processing unit
140 antenna

The invention claimed is:
1. An information processing apparatus, comprising:
a communication interface, and
processing circuitry configured to:
transmit a start instruction to a first camera apparatus and a second camera apparatus, the start instruction causing the first camera apparatus to start incrementing a first counter and the second camera apparatus to start incrementing a second counter for a video recording time period;
receive, from the first camera apparatus, a first recording-start frame identifier that indicates a value of the first counter when recording of a first video by the first camera apparatus starts within the video recording time period;
receive, from the first camera apparatus, a second recording-end frame identifier that indicates the value of the first counter when recording of the first video by the first camera apparatus stops within the video recording time period;
receive, from the second camera apparatus, a first recording-start frame identifier that identifies a value of the second counter when recording of a second video by the second camera apparatus starts within the video recording time period; and
receive, from the second camera apparatus, a second recording-end frame identifier that identifies the value of the second counter when recording of the second video by the second camera apparatus stops within the video recording time period, wherein
the first video is associated with frame identifiers that indicate the values of the first of the first camera apparatus during the recording of the first video, and
the second video is associated with frame identifiers that indicate the values of the second counter by the second camera apparatus during the recording to the second video.

2. The information processing apparatus according to claim 1, wherein
the first video corresponds to a first field of view; and
the second video corresponds to a second field of view that is different from the first field of view.

3. The information processing apparatus according to claim 1, wherein
the first video is recorded during a first sub-period of the video recording time period, and
the second video is recorded during a second sub-period of the recording time period that starts after a start time of the first sub-period.

4. The information processing apparatus according to claim 1, wherein the processing circuitry is configured to transmit an end instruction to the first camera apparatus and the second camera apparatus, the end instruction indicating an end of the video recording time period.

5. The information processing apparatus according to claim 1, wherein
the start instruction causes the first camera apparatus to start incrementing the first counter and the second camera apparatus to start incrementing the second counter for the entire video recording time period.

6. The information processing apparatus according to claim 5, wherein
the start instruction causes the first camera apparatus to start incrementing the first counter irrespective of whether the first video is being recorded, and
the start instruction causes the second camera apparatus to start incrementing the second counter irrespective of whether the second video is being recorded.

7. The information processing apparatus according to claim 1, wherein the processing circuitry is configured to request frames of the first video from the first camera apparatus based on the first recording-start frame identifier and the first recording-end frame identifier;

receive the frames of the first video from the first camera apparatus;

playback the frames of the first video received from the first camera apparatus;

request frames of the second video from the second camera apparatus based on the second recording-start frame identifier and the second recording-end frame identifier;

receive the frames of the first video from the first camera apparatus; and playback the frames of the second video received from the second camera apparatus.

8. The information processing apparatus according to claim 1, wherein the first and second counters are frame counters.

9. A system, comprising:
a first camera apparatus;
a second camera apparatus; and
an information processing apparatus, including
a communication interface, and
processing circuitry configured to:
transmit a start instruction to the first camera apparatus and the second camera apparatus, the start instruction causing the first camera apparatus to start incrementing a first counter and the second camera apparatus to start incrementing a second counter for a video recording time period;
receive, from the first camera apparatus, a first recording-start frame identifier that indicates a value of the first counter when recording of a first video by the first camera apparatus starts within the video recording time period;
receive, from the first camera apparatus, a second recording-end frame identifier that indicates the value of the first counter when recording of the first video by the first camera apparatus stops within the video recording time period;
receive, from the second camera apparatus, a first recording-start frame identifier that identifies a value of the second counter when recording of a second video by the second camera apparatus starts within the video recording time period; and
receive, from the second camera apparatus, a second recording-end frame identifier that identifies the value of the second counter when recording of the second video by the second camera apparatus stops within the video recording time period, wherein
the first video is associated with frame identifiers that indicate the values of the first of the first camera apparatus during the recording of the first video, and
the second video is associated with frame identifiers that indicate the values of the second counter by the second camera apparatus during the recording to the second video.

10. A non-transitory computer-readable medium storing instructions which when executed by a computer cause the computer to perform a method for receiving recording-start frame and recording-end frame identifiers, the method comprising:
transmitting a start instruction to a first camera apparatus and a second camera apparatus, the start instruction causing the first camera apparatus to start incrementing a first counter and the second camera apparatus to start incrementing a second counter for a video recording time period;
receiving, from the first camera apparatus, a first recording-start frame identifier that indicates a value of the first counter when recording of a first video by the first camera apparatus starts within the video recording time period;
receiving, from the first camera apparatus, a second recording-end frame identifier that indicates the value of the first counter when recording of the first video by the first camera apparatus stops within the video recording time period;
receiving, from the second camera apparatus, a first recording-start frame identifier that identifies a value of the second counter when recording of a second video by the second camera apparatus starts within the video recording time period; and
receiving, from the second camera apparatus, a second recording-end frame identifier that identifies the value of the second counter when recording of the second video by the second camera apparatus stops within the video recording time period, wherein
the first video is associated with frame identifiers that indicate the values of the first of the first camera apparatus during the recording of the first video, and
the second video is associated with frame identifiers that indicate the values of the second counter by the second camera apparatus during the recording to the second video.

11. The non-transitory computer-readable medium according to claim 10, wherein
the first video corresponds to a first field of view; and
the second video corresponds to a second field of view that is different from the first field of view.

12. The non-transitory computer-readable medium according to claim 10, wherein
the first video is recorded during a first sub-period of the video recording time period, and
the second video is recorded during a second sub-period of the recording time period that starts after a start time of the first sub-period.

13. The non-transitory computer-readable medium according to claim 10, further comprising:
transmitting an end instruction to the first camera apparatus and the second camera apparatus, the end instruction indicating an end of the video recording time period.

14. The non-transitory computer-readable medium according to claim 10, wherein
the start instruction causes the first camera apparatus to start incrementing the first counter and the second camera apparatus to start incrementing the second counter for the entire video recording time period.

15. The non-transitory computer-readable medium according to claim 14, wherein
the start instruction causes the first camera apparatus to start incrementing the first counter irrespective of whether the first video is being recorded, and
the start instruction causes the second camera apparatus to start incrementing the second counter irrespective of whether the second video is being recorded.

16. The non-transitory computer-readable medium according to claim 10, further comprising:
requesting frames of the first video from the first camera apparatus based on the first recording-start frame identifier and the first recording-end frame identifier;

receiving the frames of the first video from the first camera apparatus;

playing back the frames of the first video received from the first camera apparatus;

requesting frames of the second video from the second camera apparatus based on the second recording-start frame identifier and the second recording-end frame identifier;

receiving the frames of the first video from the first camera apparatus; and playing back the frames of the second video received from the second camera apparatus.

17. The non-transitory computer-readable medium according to claim 10, wherein the first and second counters are frame counters.

* * * * *